(12) United States Patent
Onishi et al.

(10) Patent No.: US 7,296,507 B2
(45) Date of Patent: Nov. 20, 2007

(54) PISTON FOR AUTOMATIC TRANSMISSION

(75) Inventors: Hirofumi Onishi, Aichi-gun (JP); Yuji Yasuda, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 68 days.

(21) Appl. No.: 11/367,353

(22) Filed: Mar. 6, 2006

(65) Prior Publication Data
US 2006/0201325 A1 Sep. 14, 2006

(30) Foreign Application Priority Data
Mar. 9, 2005 (JP) ............................. 2005-066121

(51) Int. Cl.
*F16D 25/638* (2006.01)
*F16D 25/00* (2006.01)

(52) U.S. Cl. .................................... 92/255; 192/85 AA
(58) Field of Classification Search .................. 92/255, 92/172; 192/48.91, 48.8, 89.2, 85 AA
See application file for complete search history.

(56) References Cited
U.S. PATENT DOCUMENTS 6,513,636 B2 * 2/2003 Han et al. ............... 192/85 AA
6,523,657 B1 * 2/2003 Kundermann et al. ..... 192/48.8
6,702,081 B2 * 3/2004 Gorman et al. ............ 192/52.2
2005/0000774 A1 * 1/2005 Friedmann ................. 192/48.8

FOREIGN PATENT DOCUMENTS

| JP | 9-32919 | | 2/1997 |
|---|---|---|---|
| JP | 09032919 A | * | 2/1997 |
| JP | 10-89380 | | 4/1998 |

* cited by examiner

*Primary Examiner*—Thomas E. Lazo
(74) *Attorney, Agent, or Firm*—Oblon, Spivak, McClelland, Maier & Neustadt, P.C.

(57) ABSTRACT

A piston for an automatic transmission, wherein a first piston member forming a cylindrical portion of the piston has a plurality of axial cutouts and a circumferential groove formed in one axial end portion thereof, and a second piston member forming a bottom portion of the piston has a plurality of radially extending engaging jaws fitted in the plurality of axial cutouts, while a retainer ring is fitted in the circumferential groove and held in abutting contact with the engaging jaws fitted in the axial cutouts, whereby the first and second piston members are fixed to each other. At least one of the engaging jaws of the second piston member cooperates with the retainer ring to form a gap therebetween, which prevents a stress concentration on portions of the circumferential groove adjacent to the axial cutouts, upon an axial movement of the piston, so that the required thickness of the retainer ring can be reduced, leading to size reduction of the piston.

8 Claims, 6 Drawing Sheets

PISTON FOR AUTOMATIC TRANSMISSION

The present application is based on Japanese Patent Application No. 2005-066121 filed Mar. 9, 2005, the contents of which are incorporated herein by reference.

BACKGROUND OF THE INVENTION

1. Field of the Invention

The present invention relates to a piston operable to force frictional coupling elements of a clutch or brake device provided in an automatic transmission, against each other to place the clutch or brake device in its engaged state.

2. Discussion of the Related Art

A known automatic transmission includes clutches and brakes each of which is provided with frictional coupling elements in the form of a plurality of friction plates, so that the automatic transmission is automatically shifted by selectively engaging and releasing the clutches and brakes. The frictional coupling elements are forced against each other by a piston, to place each clutch or brake in its engaged state. JP-9-32919A and JP-10-89380A disclose an example of such a piston, which includes two piston members, namely, a first piston member forming a cylindrical portion of the piston, and a second piston member forming a bottom portion of the piston. In the piston disclosed in those publications, the first piston member has axial cutouts formed in one of its opposite axial end portions, while the second piston member has engaging jaws fitted in the axial cutouts, and a retainer ring is fitted in a circumferential groove formed in the inner circumferential surface of the first piston member, in contact with the second piston member, so that the first and second piston members are fixed to each other into the piston. The circumferential groove consists of a plurality of arcuate grooves that are spaced apart from each other by the axial cutouts in the circumferential direction of the first piston member.

In the piston disclosed in JP-9-32919A, an axial movement of the piston causes a load to be applied from the second piston member to the circumferential groove of the first piston member through the retainer ring. The engaging formed on the second piston member extend in the radial direction of the piston and are abuttable onto the retainer ring, so that the load is applied from the engaging jaws to the retainer ring upon the axial movement of the piston. The retainer ring is merely fitted in the circumferential groove of the first piston member, in contact with the second piston member having the engaging jaws fitted in the axial cutouts of the first piston member, without any member supporting the retainer ring on its side remote from the engaging jaws, the application of the load from the second piston member to the circumferential groove of the first piston member through the retainer ring causes a stress concentration on the portions of the circumferential groove that are adjacent to the axial cutouts in the circumferential direction of the first piston member. Accordingly, those portions of the circumferential groove tend to elastically deform due to the stress concentration.

To prevent the elastic deformation of the circumferential groove of the first piston member in the piston of JP-9-32919A, therefore, the retainer ring must have a sufficiently large thickness, undesirably resulting in an increase in the size of the piston.

SUMMARY OF THE INVENTION

The present invention was made in the light of the background art discussed above. It is therefore an object of the present invention to provide a small-sized piston for an automatic transmission, which includes a first piston member forming its cylindrical portion and a second piston member forming its bottom portion that are fixed to each other by a retainer ring.

The object indicated above may be achieved according to the principle of the present invention, which provides a piston for an automatic transmission, comprising: a first piston member forming a cylindrical portion of the piston and having a plurality of axial cutouts and a circumferential groove formed in one axial end portion thereof; a second piston member forming a bottom portion of the piston and having a plurality of radially extending engaging jaws fitted in the plurality of axial cutouts; and a retainer ring which is fitted in the circumferential groove and held in abutting contact with the engaging jaws, whereby the first and second piston members are fixed to each other, and wherein at least one of the plurality of engaging jaws of the second piston member cooperates with the retainer ring to form a gap therebetween.

In the piston of the present invention constructed as described above, at least one of the radially extending engaging jaws of the second piston member held in abutting contact with the retainer ring cooperates with the retainer ring to form or define the gap therebetween. In the presence of this gap, a load is not applied to the retainer ring from the engaging jaws, that is, from the circumferential portions of the second piston member which correspond to the axial cutouts, when the retainer ring is forced by the second piston member upon an axial movement of the piston. Accordingly, the gap formed between the engaging jaw and the retainer ring prevents a stress concentration on the portions of the circumferential groove of the first piston member which are adjacent to the axial cutouts, so that the required thickness of the retainer ring can be reduced, leading to size reduction of the piston.

According to a first preferred form of this invention, each of the above-indicated at least one of the plurality of engaging jaws has a shoulder portion including a radially outer part and a radially inner part which are formed such that the radially outer part is spaced from the radially inner part in an axial direction of the second piston member away from the retainer ring, the shoulder portion cooperating with the retainer ring to form said gap.

According to a second preferred form of this invention, axially inner ends of the plurality of axial cutouts are defined by respective radial end surfaces which are parallel to a radial direction of the first piston member and which are spaced apart from the circumferential groove in an axial direction of the first piston member away from axially outer ends of the axial cutouts, the plurality of engaging jaws consisting of at least one elastically biasing jaw which is inclined in the axial direction of the second piston member toward the radial end surfaces and each of which is held in abutting contact with the radial end surface of a corresponding one of the plurality of axial cutouts, and at least one non-elastically-biasing jaw which is not held in abutting contact with the radial end surface of the corresponding axial cutout, each of the at least one non-elastically-biasing jaw cooperating with the retainer ring to define a first gap therebetween, while each of the at least one elastically biasing jaw cooperating with the retainer ring to define a second gap therebetween, a dimension of the first gap in the axial direction of the piston being smaller than a dimension of the second gap in the axial direction of the piston.

In the piston according to the second preferred form of the invention, each elastically biasing jaw inclined in the axial direction of the second piston member toward the radial end surface of the corresponding axial cutout is held in abutting contact with the radial end surface, so that the first piston member is axially biased by each elastically biasing jaw. The at least one elastically biasing jaw is effective to minimize a relative axial rattling displacement of the first and second piston members of the piston, which would take place due to dimensional errors of the piston members even where the dimensional errors are held within predetermined tolerances. Accordingly, the at least one elastically biasing jaw reduces a degree of deterioration of durability of the first piston member and frictional coupling elements (friction plates) of a clutch or brake device, which may take place due to unnecessary abutting contacts of the first piston member with the frictional coupling elements. Therefore, the at least one elastically biasing jaw is effective to reduce a power loss of the automatic transmission due to a dragging phenomenon of the clutch or brake device in which the frictional coupling elements are forced against each other by the piston while the clutch or brake device is not required to be placed in its engaged state.

The piston according to the second preferred form of the invention is further advantageous owing to the axial dimension of the first gap formed between the non-elastically-biasing jaw and the radially outer end portion of the retainer ring, which axial dimension is smaller than the axial dimension of the second gap formed between the elastically biasing jaw in the form of the second engaging jaw and the retainer ring. This dimensional relationship between the first and second gaps is advantageous upon assembling of the first and second piston members. Namely, the elastic and non-elastically-biasing jaw may deform during the assembling, due to a relative axial movement of the first and second piston members. Even in the event of this deformation of the elastic and non-elastically-biasing jaw biasing jaws, the non-elastically-biasing jaw are brought into abutting contact with the retainer ring before the elastically biasing jaws are brought into abutting contact with the retainer ring. When the non-elastically-biasing jaw is brought into abutting contact with the retainer ring, the first piston member is prevented from being further moved in the axial direction relative to the second piston member, so that subsequent elastic deformation of the elastically biasing jaw is prevented, whereby plastic deformation of the elastically biasing jaw is prevented.

Although at least one of the plurality of engaging jaws (two or more engaging jaws) of the second piston member is required to cooperate with the retainer ring to form a gap therebetween, it is desirable that all of the engaging jaws cooperate with the retainer ring to form respective gaps therebetween.

In the piston according to the first preferred form of the invention, the radially outer and inner parts of the shoulder portion are formed such that the radially outer part is spaced apart from the radially inner part in the axial direction of the second piston member away from the retainer ring. In this case, each engaging jaw which partly defines the gap may have a thickness equal to the thickness of the respect of the second piston member. However, the gap may be formed between the retainer ring and a portion of the engaging jaw which has a smaller thickness than the other portion of the engaging jaw. The shoulder portion of the engaging jaw may be formed by forming the second piston member by bending a planar blank or workpiece by a press-forming operation, for example, or by machining a blank or workpiece.

Each of the above-indicated at least one of the plurality of engaging jaws may consist of a single straight portion which extends radially outwardly of the second piston member and which is bent at a proximal end thereof with respect to a radial direction of the second piston member such that a distal end of the single straight portion is spaced from the proximal end in an axial direction of the second piston member away from said retainer ring.

The inner end of the gap as seen in the radial direction of the second piston member may be located outwards of the inner circumferential surface of the first piston member in which the circumferential groove is formed. However, the inner end of the gas is preferably located inwards of the inner circumferential surface of the first piston member. This arrangement is effective to reduce the stress concentration on the circumferential portions of the circumferential groove that are adjacent to the axial cutouts. If the inner end of the gap is located considerably inwards of the inner circumferential surface of the first piston member, the surface area of the engaging jaw in abutting contact with the retainer ring is accordingly reduced, so that the load to be applied to the retainer ring from the second piston member is not uniform in the circumferential direction of the retainer ring. Therefore, the inner end of the gap is preferably located inwards of the inner circumferential surface of the first piston member, but as close as possible to the inner circumferential surface of the first piston member.

The at least one elastically biasing jaw provided in the piston according to the second preferred form of the invention need not be provided according to the principle of this invention. In the second preferred form, the at least one elastically biasing jaw is provided as well as the at least one non-elastically-biasing jaw. Each elastically biasing jaw is inclined in the axial direction of the second piston member toward the radial end surface of the corresponding axial cutout. Namely, each elastically biasing jaw includes the radially outer and inner parts which are formed such that the radially outer part is spaced from the radially inner part in the axial direction of the second piston member toward the radial end surface and away from the retainer ring. The elastically biasing jaw may have the shoulder portion provided in the first preferred form of the invention described above, or may consist of the single straight portion described above. Irrespective of the configuration of the elastically biasing jaw, the gap is formed between this elastically biasing jaw and the retainer ring, and the elastically biasing jaw functions as the at least one engaging jaw provided according to the principle of the present invention described above. The engaging jaw is considered to be the elastically biasing jaw when the amount of gap partially defined by the engaging jaw in abutting contact with the radial end surface is relatively large. In other words, the amount of gap partially defined by the elastically biasing jaw is larger than that partially defined by the non-elastically-biasing jaw.

BRIEF DESCRIPTION OF THE DRAWINGS

The above and other objects, features, advantages and technical and industrial significance of the present invention will be better understood by reading the following detailed description of preferred embodiments of this invention, when considered in connection with the accompanying drawings, in which.

DETAILED DESCRIPTION OF THE PREFERRED EMBODIMENTS

Figure 1:
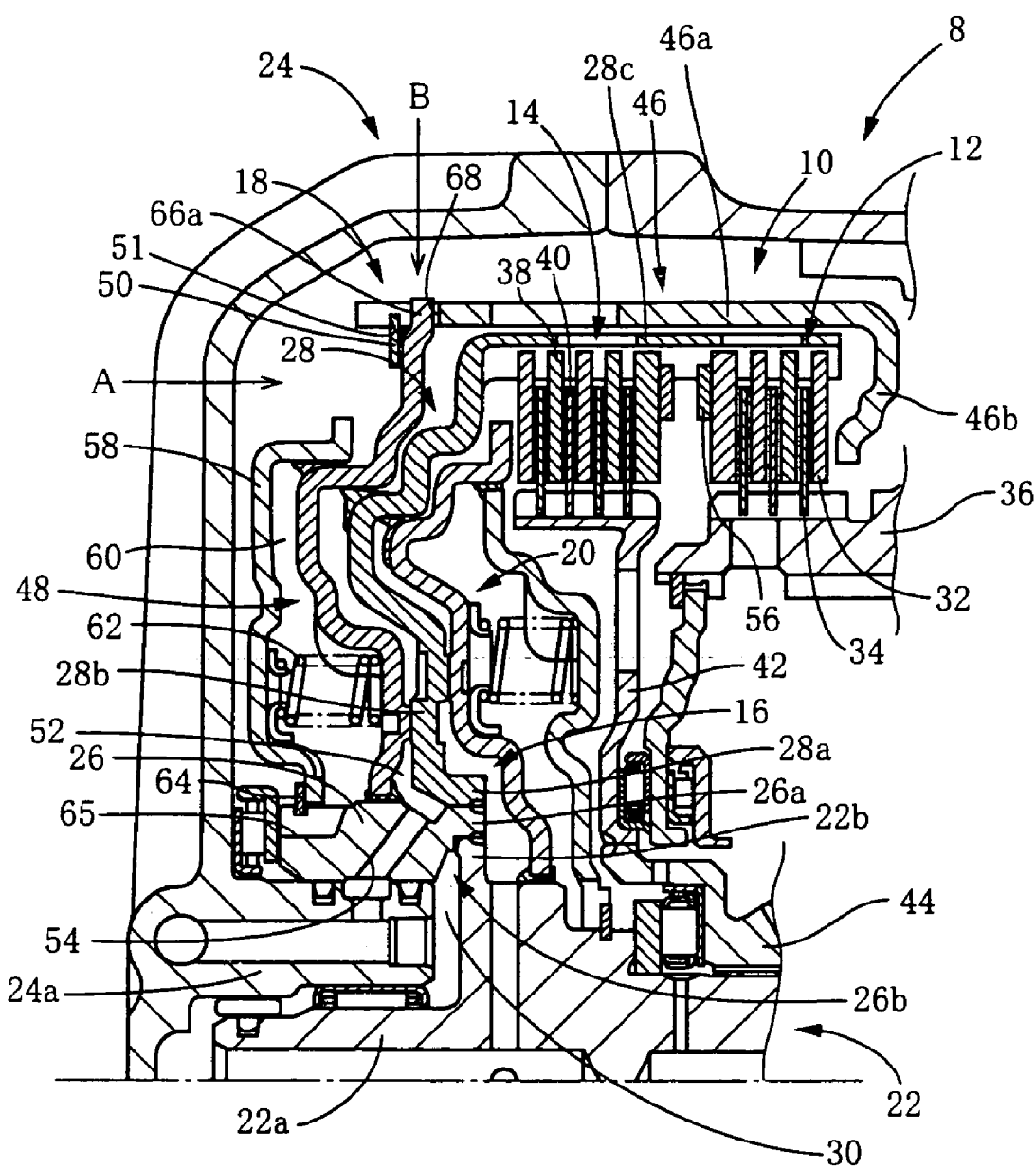
FIG. 1 is a fragmentary elevational view in cross section of an automatic transmission which is provided a clutch device including a piston in the form of a radially outer piston constructed according to a first embodiment of this invention.

Referring first to the elevational view in cross section of FIG. 1, there is shown a part of an automatic transmission 8 which is provided with a clutch device 10 including a piston in the form of a radially outer piston 18 constructed according to one embodiment of this invention.

The clutch device 10 is of a double clutch construction, and includes: a clutch drum 16 supporting a first set of frictional coupling elements 12 and a second set of frictional coupling elements 14; the above-indicated radially outer piston 18 disposed radially outwardly of the clutch drum 16 so as to cover the clutch drum 16; and a radially inner piston 20 disposed radially inwardly of the clutch drum 16.

The automatic transmission 8 has a casing 24, and an input shaft 22 which is rotatably supported at its end portion 22a by the casing 24. The input shaft 22 has a flange portion 22b which is located at an axial position near the end portion 22a. The flange portion 22b extends radially outwardly perpendicularly to the axis of the input shaft 22. The input shaft 22 is a turbine shaft of a torque converter driven by a drive power source such as an engine of an automotive vehicle.

The clutch drum 16 consists of a radially inner boss portion 26 and a radially outer drum portion 28. The radially inner boss portion 26 is a generally cylindrical member which has a substantially constant outside diameter and which is fitted on an axially extending cylindrical portion 24a of the casing 24. The radially inner boss portion 26 includes a thin-walled axial end portion 26a on the side of the radially inner piston 20. The inner circumferential surface of the radially inner boss portion 26 has a tapered and stepped portion 26b which is adjacent to the axial end portion 26a. The tapered part of the tapered and stepped portion 26b has an inside diameter which increases in an axial direction of the radially inner boss portion 26 toward the thin-walled axial end portion 26a. The axial end portion 26a has an end face which is flush with one of opposite surfaces of the flange portion 22b of the input shaft 22 which is on the side of the radially inner piston 20. The radially inner boss portion 26 and the input shaft 22 are welded to each other at the outer circumferential surface of the flange portion 22b and the inner circumferential surface of the axial end portion 26a. The flange portion 22b of the input shaft 22 and the tapered and stepped portion 26b of the axial end portion 26a of the radially inner boss 26 cooperate to partially define an oil sump 30, which is formed radially inwardly of the tapered and stepped portion 26b.

The radially outer drum portion 28 is a cylindrical member consisting of an inner cylindrical portion 28a, an outer cylindrical portion 28c, and an annular bottom portion 28b which connects the corresponding axial ends of the inner and outer cylindrical portions 28a, 28c. The radially outer drum portion 28 is closed at its one axial end by the annular bottom portion 28b and is open at the other axial end.

The inner cylindrical portion 28a is fitted on the thin-walled axial end portion 26a of the radially inner boss portion 26, and the end face of the inner cylindrical portion 28a which is on the side of the radially inner piston 20 is flush with the corresponding end face of the axial end portion 26a. The radially inner boss portion 26 and radially outer drum portion 28 are welded to each other at the inner circumferential surface of the inner cylindrical portion 28a and the outer circumferential surface of the axial end portion 26a. Accordingly, the radially outer drum portion 28 as well as the radially inner boss portion 26 is rotated with the input shaft 22.

The annular bottom portion 28b of the radially outer drum portion 28 extends generally in the radial direction of the input shaft 22, and is connected at its radially inner end to the axial end of the inner cylindrical portion 28a which is on the side of the radially outer clutch piston 18. The outer cylindrical portion 28c extends from the radially outer end of the annular bottom portion 28b in the axial direction (in the right direction as seen in FIG. 1). The outer cylindrical portion 28c holds a plurality of inwardly extending friction plates 32 of the first set of frictional coupling elements 12, and a plurality of inwardly extending friction plates 38 of the second set of frictional coupling elements 14, such that the friction plates 32 are splined to a portion of the inner circumferential surface of the outer cylindrical portion 28c, which portion is relatively near the axial open end of the outer cylindrical portion 28c, and such that the friction plates 38 are splined to a portion of the inner circumferential surface which is relatively near the annular bottom portion 28b and relatively remote from the above-indicated axial open end. The friction plates 32, 38 extend from the inner circumferential surface of the outer cylindrical portion 28c in the radially inward direction of the clutch drum 16. The first set of frictional coupling elements 12 consist of the above-indicated inwardly extending friction plates 32 and a plurality of outwardly extending friction plates 34, which are alternately arranged in the axial direction of the clutch drum 16. Similarly, the second set of frictional coupling elements 14 consist of the above-indicated inwardly extending friction plates 38 and a plurality of outwardly extending friction plates 40, which are alternately arranged in the axial direction.

The outwardly extending friction plates 34 of the first set of frictional coupling elements 12 are splined to the outer circumferential surface of a ring gear 36 of the automatic transmission 8 which functions as a clutch hub. The outwardly extending friction plates 40 of the second set of frictional coupling elements 14 are splined to the outer circumferential surface of a clutch hub 42. The clutch hub 42 is fixedly fitted at its inner circumferential surface on a sun gear 44 which is fixedly fitted on the input shaft 22, so that the clutch hub 42 is rotated with the sun gear 44.

The radially outer piston 18 consists of: a first piston member 46 which is disposed radially outwardly of the outer cylindrical portion 28c of the radially outer drum portion 28 and which forms a cylindrical portion of the piston 18; an annular second piston member 48 which engages one of the opposite axial end portions of the first piston member 46 and which forms a bottom portion of the piston 18; and a retainer ring 50 which is fixed to the above-indicated one axial end portion of the first piston member 46 and which is provided to prevent removal of the second piston member 48 from the first piston member 46. The retainer ring 50 is fitted at its radially outer portion in a circumferential groove 51 formed in the inner circumferential surface of the first piston member 46. The circumferential groove 51 consists of a plurality of arcuate grooves which are spaced apart from each other by a plurality of axial cutouts 68 (which will be described) in the circumferential direction of the first piston member 46.

The second piston member 48 of the radially outer piston 18 is axially slidable at its inner circumferential surface on the radially inner boss portion 26. The second piston member 48 and the annular bottom portion 28b of the radially outer drum portion 28 cooperate to define a first hydraulic pressure chamber 52 to which a working oil is fed through an oil passage 54 formed through the radially inner boss portion 26, so that the radially outer piston 18 is axially movable such that the second piston member 48 is moved away from the annular bottom portion 28b of the radially outer drum portion 28.

On one of opposite axial sides of the second piston member 48 which is remote from the first hydraulic pressure chamber 52, there is disposed a balancer 58 such that the balancer 58 is fitted at its inner circumferential surface on the outer circumferential surface of the radially inner boss portion 26. The balancer 58 cooperates with the second piston member 48 of the radially outer piston 18 to define a second hydraulic pressure chamber 60. A return spring 62 is interposed between the balancer 58 and the second piston member 48, to bias the balancer 58 and second piston member 48 in opposite axial directions away from each other. The axial position of the balancer 58 biased by the return spring 62 in the axial direction away from the radially outer piston 18 is determined by abutting contact of the balancer 58 at its radially inner end portion with a retainer ring 64 fixed to the outer circumferential surface of the radially inner boss portion 26.

The radially inner boss portion 26 has an oil passage (not shown) for communication between the second hydraulic pressure chamber 60 and the oil sump 30, so that the working oil is introduced into the second hydraulic pressure chamber 60 through this oil passage. Accordingly, the second hydraulic pressure chamber 60 functions as a canceling chamber for canceling a centrifugal hydraulic pressure developed in the first hydraulic pressure chamber 52. The working oil is discharged from the second hydraulic pressure chamber 60 into a space on the axial side of the balancer 58 remote from the second hydraulic pressure chamber 60, through an axial groove 65 formed through an axial portion of the radially boss portion 26 on which the balancer 58 is fitted.

The first piston member 46 of the radially outer piston 18 is formed by pressing, and consists of a cylindrical portion 48a disposed radially outwardly of the outer cylindrical portion 28c of the radially outer drum portion 28, and a presser portion 46b formed to extend from one axial end of the cylindrical portion 46a which is remote from the second piston member 48. The presser portion 46b extends generally in the radially inward direction and is inclined in the axial direction toward the first set of frictional coupling elements 12, such that the radially inner end of the presser portion 46b is opposed to the nearest friction plate 32 of the first set of frictional coupling elements 12. When the first hydraulic pressure chamber 52 is not supplied with the pressurized working oil, there is left a small amount of clearance between the radially inner end of the pressure portion 46b and the above-indicated nearest friction plate 32. The outer cylindrical portion 28c of the radially outer drum portion 28 has a retainer ring 56 fixed to its inner circumferential surface to prevent an axial movement of the first set of frictional coupling elements 12 toward the second set of frictional coupling elements 14.

Figure 2:
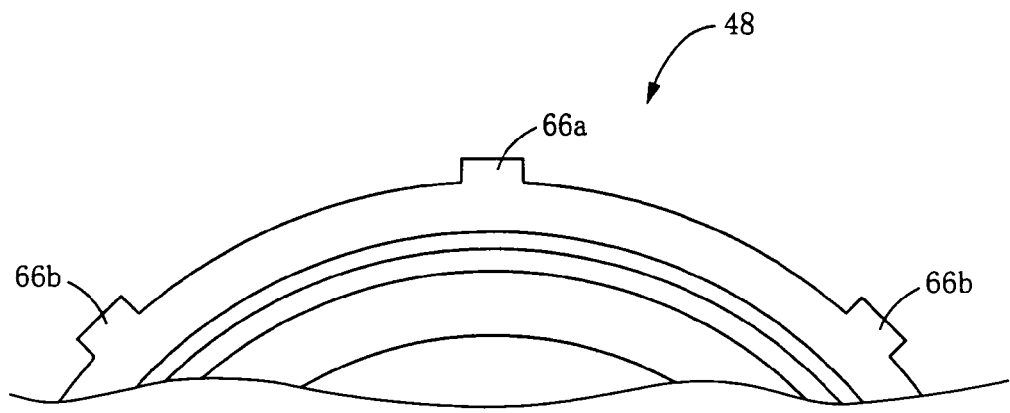
FIG. 2 is a view taken in a direction of arrow-headed line A of FIG. 1.

Referring next to the view of FIG. 2 taken in the direction of arrow-headed line A in FIG. 1, there is shown the second piston member 48 of the radially outer piston 18. The second piston member 48 is also formed by pressing, and has a plurality of first engaging jaws 66a and a plurality of second engaging jaws 66b, for example, four first engaging jaws 66a and four second engaging jaws 66b, which extend radially outwardly from the outer circumference of the second piston member 48, as shown in FIG. 2. The first and second engaging jaws 66a, 66b are alternately arranged with a predetermined spacing distance in the circumferential direction of the second piston member 48. These first and second engaging jaws 66a, 66b are collectively referred to simply as engaging jaws 66.

Figure 3:
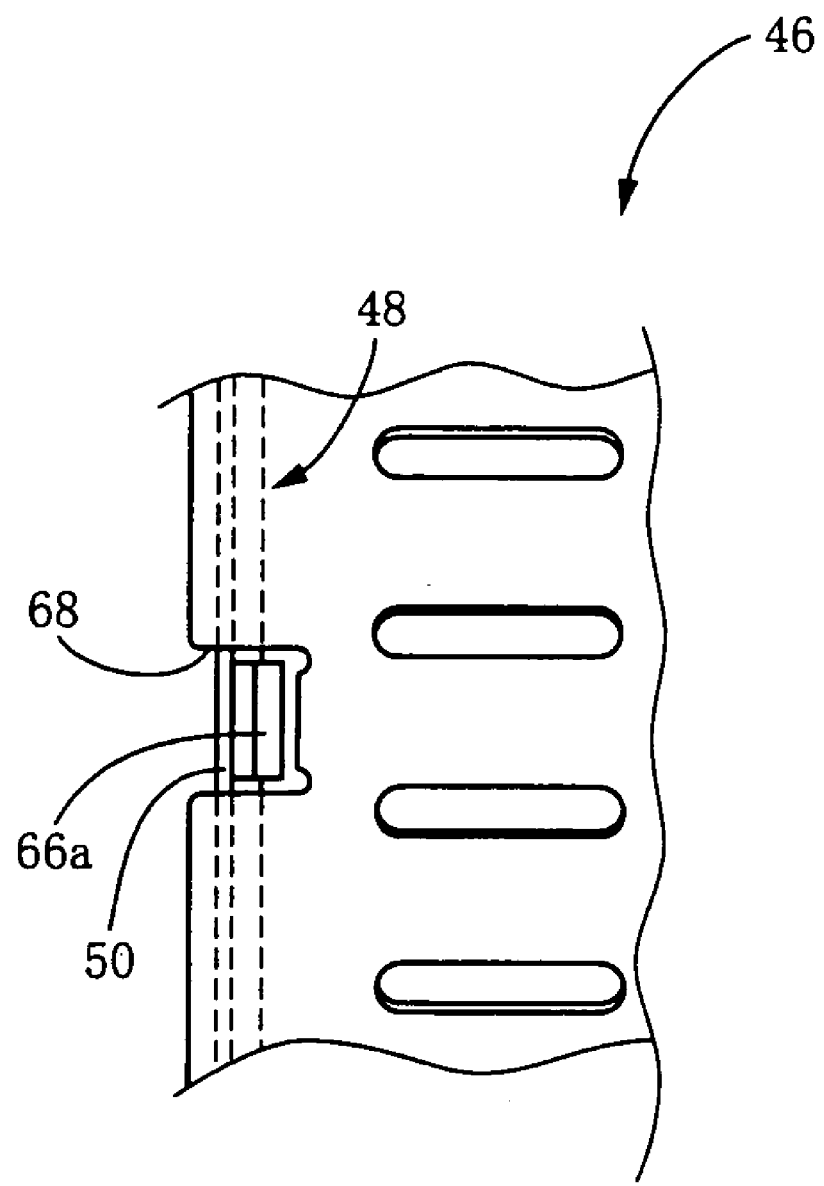
FIG. 3 is a view taken in a direction of arrow-headed line B of FIG. 1.

The cylindrical portion 46a of the first piston member 46 has the plurality of axial cutouts 68 indicated above, as shown in FIG. 3 which is a view taken in a direction of arrow-headed line B in FIG. 1. These cutouts 68 are formed in an axial end part of the cylindrical portion 46a at which the first piston member 46 is fixed to the second piston member 48. The cutouts 68 extend from the end of the above-indicated axial end part of the cylindrical portion 46a, in the axial direction of the first piston member 46, and are formed through the wall thickness of the cylindrical portion 46a. The engaging jaws 66 of the second piston member 48 are held in engagement with the respective axial cutouts 68, which are spaced apart from each other in the circumferential direction of the first piston member 46, with the same spacing distance as the engaging jaws 66.

Figure 4:
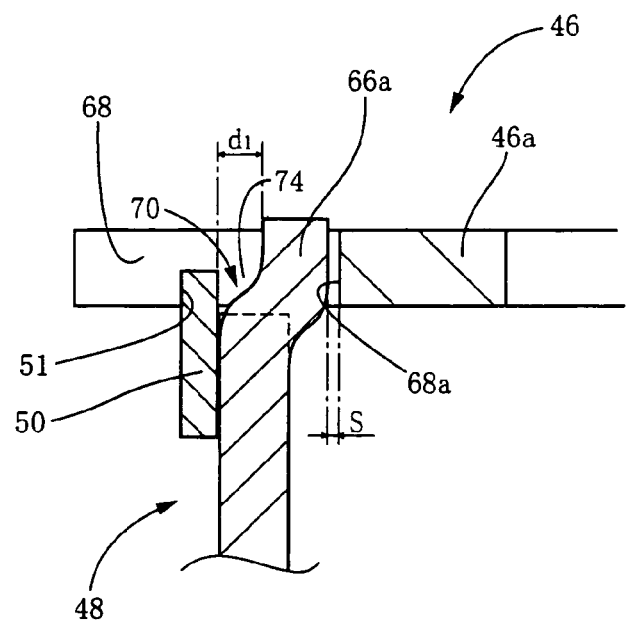
FIG. 4 is an enlarged cross sectional view showing a first engaging jaw of the piston and its vicinity.
Figure 5:
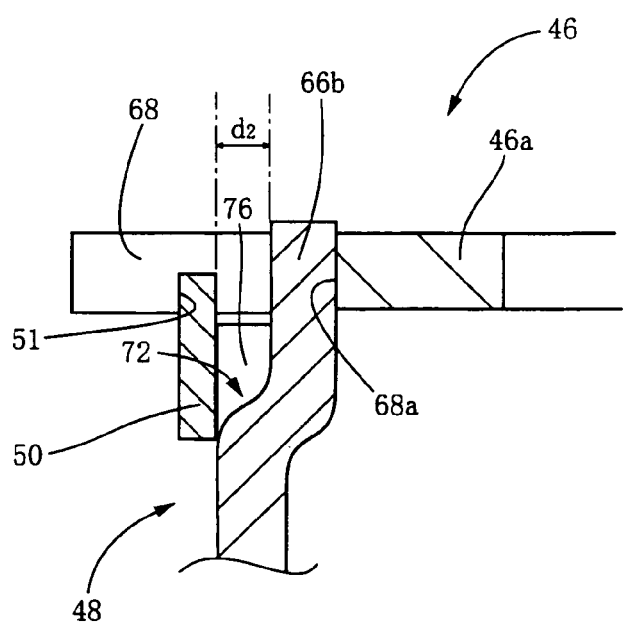
FIG. 5 is an enlarged cross sectional view showing an elastically biasing jaw in the form of a second engaging jaw of the piston and its vicinity.

Referring to the enlarged cross sectional views of FIGS. 4 and 5, there are respectively shown one of the first engaging jaws 66a and its vicinity, and one of the second engaging jaws 66b and its vicinity. As shown in FIGS. 4 and 5, each of the first and second engaging jaws 66a, 66b is bent in an axial direction of the first piston member 46 away from the retainer ring 50, so that the thus bent first and second engaging jaws 66a, 66b provide respective first and second shoulder portions 70, 72 on the side of the retainer ring 50. The first and second shoulder portions 70, 72 cooperate with the radially outer portion of the retainer ring 50 to define respective first and second gaps 74, 76 therebetween. Each of the shoulder portions 70, 72 includes a radially inner part and a radially outer part which are formed such that the radially outer part is spaced from the radially inner part in the axial direction of the second piston member 48 away from the retainer ring 50. The second piston member 48 has a constant thickness in the radial direction. That is, the thickness of each engaging jaw 66 is equal to the thickness of the rest of the second piston member 48.

The amount of bending of the first engaging jaws 66a is smaller than that of the second engaging jaws 66b, so that a dimension d1 of the first gap 74 in the axial direction of the radially outer piston 18 is smaller than a dimension d2 of the second gap 76 in the axial direction. In this arrangement, each first engaging jaw 66a is spaced apart from a radial end surface 68a which is parallel to the radial direction of the first piston member 46 and which defines the axially inner end of the corresponding axial cutout 68. The radial end surface 78*a* is spaced apart from the circumferential groove 51 in the axial direction of the first piston member 46 away from the axially outer end of the corresponding axial cutout 68. On the other hand, each second engaging jaw 66*b* is held in abutting contact with the radial end surface 68*a*, while biasing the first piston member 46 in the axial direction away from the retainer ring 50, so that the second engaging jaws 66*b* function as elastically biasing jaws. In this respect, the first engaging jaws 66*a* are referred to as non-elastically-biasing jaws.

If all of the engaging jaws 66 of the second piston member 48 were the first engaging jaws 66*a*, without the second engaging jaws 66*b* functioning as the elastically biasing jaws, the first and second piston members 46, 48 would be displaceable relative to each other in their axial direction by a distance equal to a gap S left between the radial end surfaces 68*a* and the engaging jaws 66*a*. In the present embodiment, however, the second engaging jaws 66*b* the radially outer end portions of which are held in abutting contact with the radial end surfaces 68*a* bias the first piston member 46 in the axial direction, thereby minimizing or preventing a relative axial rattling displacement between the first and second piston members 46, 48.

The first and second shoulder portions 70, 72 are located at different positions in the radial direction of the second piston member 48, and the radially inner ends of the first and second gaps 74, 76 are accordingly located at different positions in the radial direction. Described in detail, the radially inner end of the first gap 74 is located slightly inwards of the inner circumferential surface of the cylindrical portion 46*a* of the first piston member 46 (in which the circumferential groove 51 is formed), while the radially inner end of the second gap 76 is located near and slightly outwards of the inner circumference of the retainer ring 50. Since the radially inner end of the first gap 74 is located slightly inwards of the inner circumferential surface of the first piston member 46, the amount of a load which is applied to the retainer ring 50 from the circumferential portions of the second piston member 48 corresponding to the first engaging jaws 66*a* is almost equal to the amount of a load which is applied to the retainer ring 50 from the circumferential portions of the second piston member 48 not corresponding to the first and second jaws 66*a*, 66*b*. Accordingly, the load to be applied from the second piston member 48 to the retainer ring 50 is made more uniform in the circumferential direction of the retainer ring 50, in the present embodiment than in an arrangement in which the radially inner ends of the first gaps 74 were located near or radially inwards of the inner circumference of the retainer ring 50, like the radially inner ends of the second gaps 76. The radial position of the radially inner ends of the second gaps 76 and the radial position of the second shoulder portions 72 are determined by a required elastic force to be generated by the second engaging jaws 66*b*, and may be located outwards of the radial positions shown in FIG. 5, provided the elastic force to be generated is held within a predetermined suitable range.

In the radially outer piston 18 according to the present embodiment of this invention, the first gaps 74 are formed between the first engaging jaws 66*a* and the radially outer end portion of the retainer ring 50, while the second gaps 76 are formed between the second engaging jaws 66*b* and the retainer ring 50, so that the engaging jaws 66 do not force the retainer ring 50 upon application of an axial load from the second piston member 48 to the retainer ring 50 when the radially outer piston 18 is axially moved to engage the clutch device 10. Therefore, the present radially outer piston 18 does not suffer from a stress concentration on the circumferential portions of the circumferential groove 51 of the first piston member 46 which are adjacent to the axial cutouts 68, so that the thickness of the retainer ring 50 can be made comparatively small.

Further, the axial dimension d1 of the first gaps 74 formed between the non-elastically-biasing jaws in the form of the first engaging jaws 66*a* and the radially outer end portion of the retainer ring 50 is smaller than the axial dimension d2 of the second gaps 76 formed between the elastically biasing jaws in the form of the second engaging jaws 66*b* and the retainer ring 50. This dimensional relationship between the first and second gaps 74, 76 is advantageous upon assembling of the first and second piston members 46, 48. Namely, the first and second engaging jaws 66*a*, 66*b* may deform during the assembling, due to a relative axial movement of the first and second piston members 46, 48. Even in the event of this deformation of the engaging jaws 66, the first engaging jaws 66*a* are brought into abutting contact with the retainer ring 50 before the second engaging jaws 66*b* are brought into abutting contact with the retainer ring 50. When the first engaging jaws 66*a* are brought into abutting contact with the retainer ring 50, the first piston member 46 is prevented from being further moved in the axial direction relative to the second piston member 48, so that subsequent elastic deformation of the second engaging jaws 66*b* is prevented, whereby plastic deformation of the second engaging jaws 66*b* is prevented, so that the second engaging jaws 66*b* can function as the elastically biasing jaws.

Figure 6:
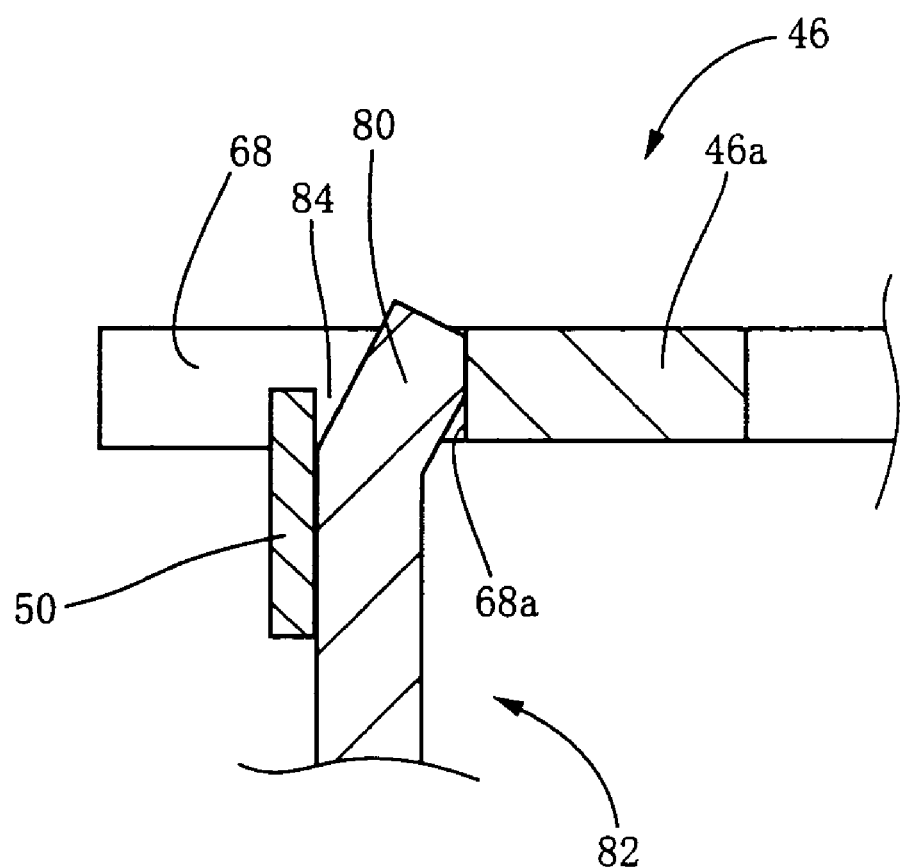
FIG. 6 is an enlarged cross sectional view corresponding to that of FIG. 4, showing a first engaging jaw of a piston constructed according to a second embodiment of this invention.

Referring next to FIG. 6, there is shown a second piston member 82 of a piston according to a second embodiment of this invention. The second piston member 82 has a plurality of first engaging jaws 80 one of which is shown in FIG. 6. In this embodiment, each first engaging jaw 80 is inclined at its proximal end in the axial direction of the second piston member 82 away from the retainer ring 50. This first engaging jaw 80 consists of a single straight portion which extends radially outwardly of the second piston member 82 and which is bent at its proximal end with respect to the radial direction of the second piston member 82 such that the distal end of the single straight portion is spaced from the proximal end in the axial direction away from the retainer ring 50. The engaging jaw 80 is not considered to have a shoulder portion, in that the first engaging jaw 80 does not include a radial portion parallel to the radial direction of the second piston member 82. In this embodiment, too, a gap 84 is formed between each first engaging jaw 80 and the radially outer end portion of the retainer ring 50. The first engaging jaws 80 are held in abutting contact with the radial end surfaces 68*a*, and may be considered to function as elastically biasing jaws, like the second engaging jaws 66*b*.

Figure 7:
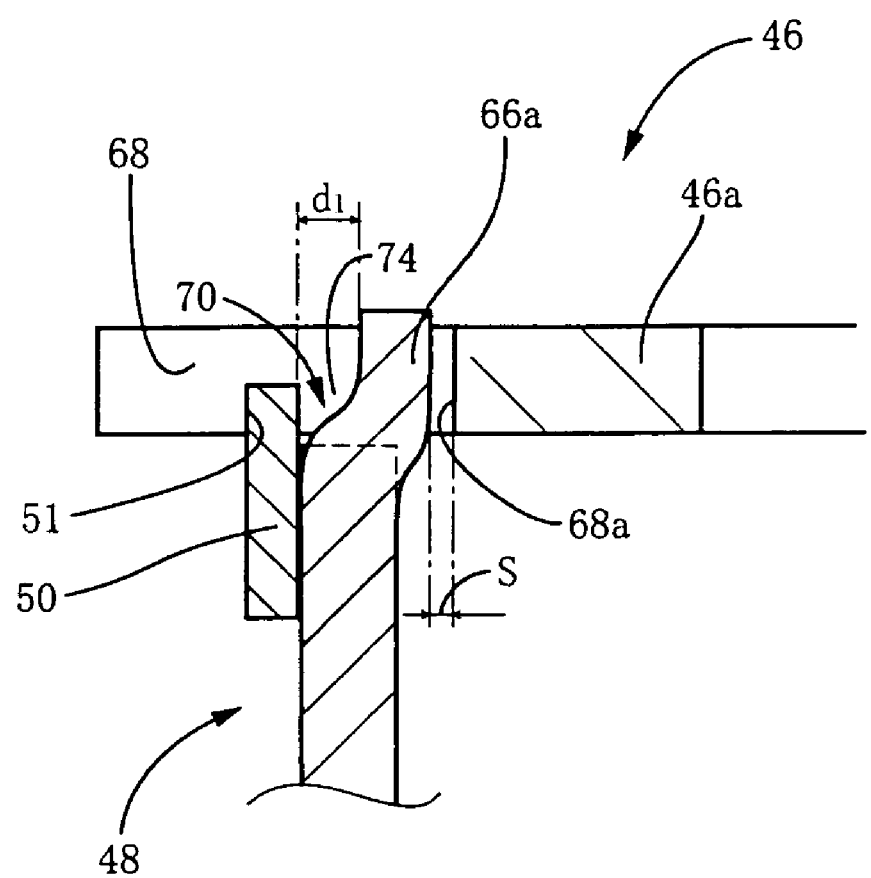
FIG. 7 is an enlarged cross sectional view corresponding to that of FIG. 4, showing a first engaging jaw of a piston constructed according to a third embodiment of this invention.

Referring next to FIG. 7, there is shown a second piston member 48 of a piston according to a third embodiment of this invention. The second piston member 48 in the third embodiment is constituted as same as the first embodiment shown in FIG. 4 except a thickness of the engaging jaws 66*a*. The engaging jaws 66*a* has a smaller thickness than the other portion of the engaging jaws 66*a* and the second piston member 48.

In the illustrated embodiments, the radially outer piston is used for the clutch device 10, the principle of this invention is equally applicable to a piston used for a brake device of an automatic transmission of a vehicle.

It is to be understood that the present invention may be embodied with various other changes, modifications and improvements which may occur to those skilled in the art, in the light of the foregoing teachings.

What is claimed is:

1. A piston for an automatic transmission, comprising:
a first piston member forming a cylindrical portion of the piston and having a plurality of axial cutouts and a circumferential groove formed in one axial end portion thereof;
a second piston member forming a bottom portion of the piston and having a plurality of radially extending engaging jaws fitted in said plurality of axial cutouts; and
a retainer ring which is fitted in said circumferential groove and held in abutting contact with said engaging jaws, whereby the first and second piston members are fixed to each other,
wherein at least one of said plurality of engaging jaws of the second piston member cooperates with said retainer ring to form a gap therebetween.

2. The piston according to claim 1, wherein each of said at least one of said plurality of engaging jaws has a shoulder portion including a radially outer part and a radially inner part which are formed such that the radially outer part is spaced from the radially inner part in an axial direction of said second piston member away from said retainer ring, said shoulder portion cooperating with said retainer ring to form said gap.

3. The piston according to claim 1, wherein axially inner ends of said plurality of axial cutouts are defined by respective radial end surfaces which are parallel to a radial direction of said first piston member and which are spaced apart from said circumferential groove in an axial direction of the first piston member away from axially outer ends of the axial cutouts, said plurality of engaging jaws consisting of at least one elastically biasing jaw which is inclined in the axial direction of said second piston member toward said radial end surfaces and each of which is held in abutting contact with the radial end surface of a corresponding one of said plurality of axial cutouts, and at least one non-elastically-biasing jaw which is not held in abutting contact with the radial end surface of the corresponding axial cutout, each of said at least one non-elastically-biasing jaw cooperating with said retainer ring to define a first gap therebetween, while each of said at least one elastically biasing jaw cooperating with said retainer ring to define a second gap therebetween, a dimension of said first gap in the axial direction of the piston being smaller than a dimension of said second gap in the axial direction of the piston.

4. The piston according to claim 1, wherein all of said plurality of engaging jaws cooperate with said retainer ring to form respective gaps.

5. The piston according to claim 1, wherein each of said at least one of said plurality of engaging jaws has a thickness which is equal to a thickness of a rest of said second piston member.

6. The piston according to claim 1, wherein each of said at least one of said plurality of engaging jaws has a smaller thickness than the other portion of the engaging jaws.

7. The piston according to claim 1, wherein each of said at least one of said plurality of engaging jaws consists of a single straight portion which extends radially outwardly of said second piston member and which is bent at a proximal end thereof with respect to a radial direction of the second piston member such that a distal end of said single straight portion is spaced from said proximal end in an axial direction of the second piston member away from said retainer ring.

8. The piston according to claim 1, wherein an inner end of said gap as seen in a radial direction of said second piston member is located inwards of an inner circumferential surface of said first piston member.

* * * * *